United States Patent Office 2,911,723
Patented Nov. 10, 1959

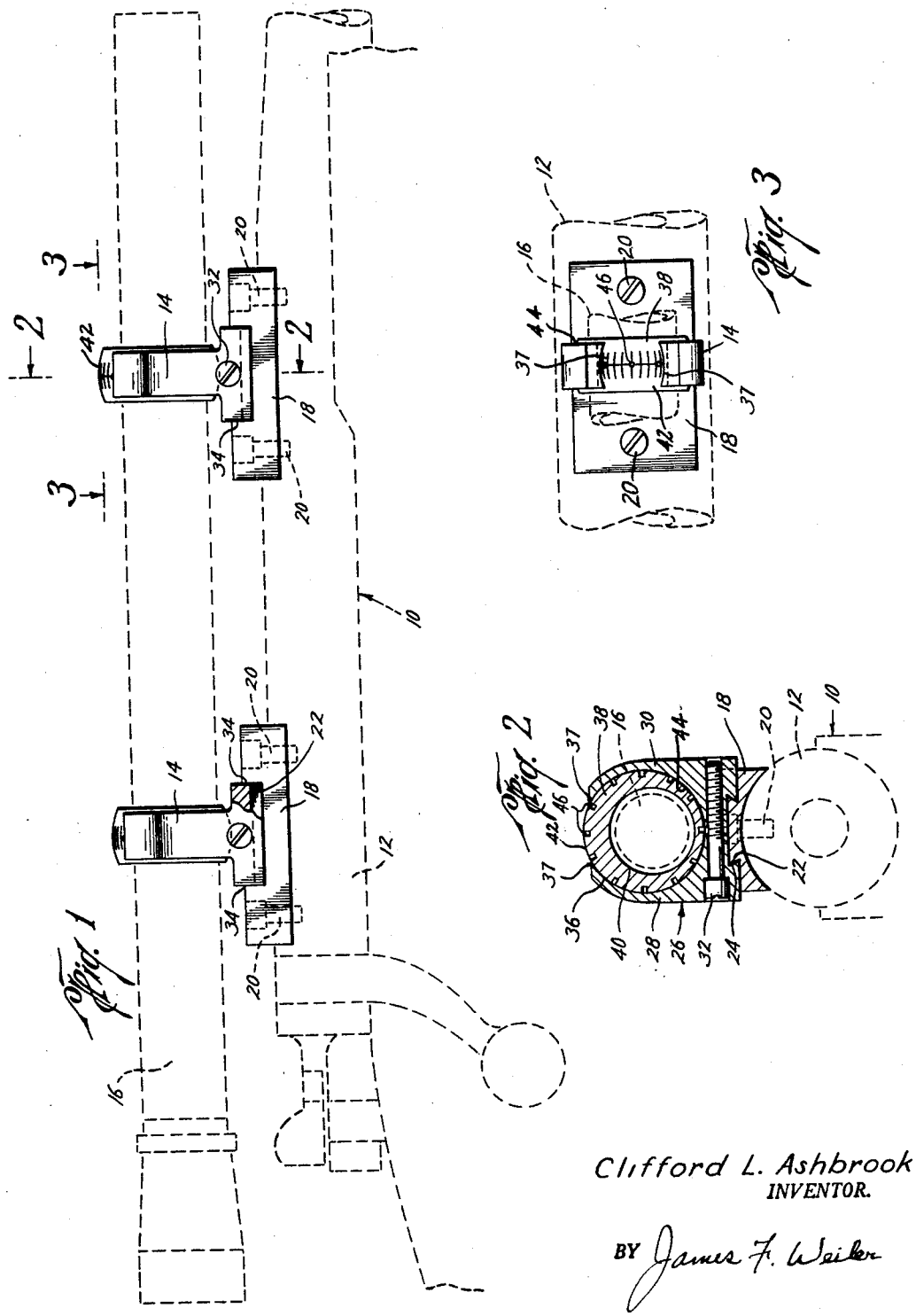

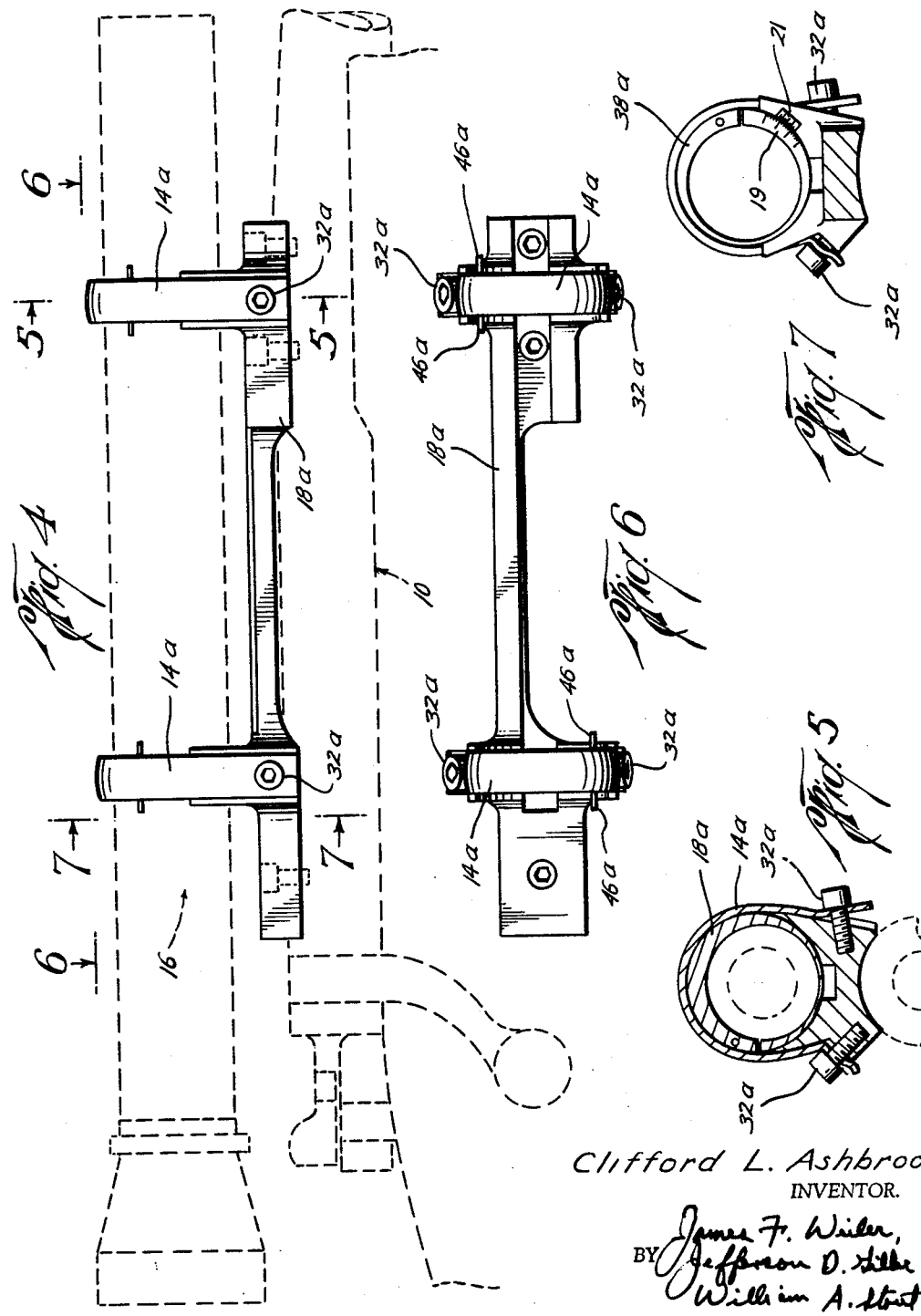

2,911,723
TELESCOPIC SIGHT MOUNTING

Clifford L. Ashbrook, Houston, Tex.

Substitute for abandoned application Serial No. 359,711, June 5, 1953. This application August 14, 1957, Serial No. 678,464

7 Claims. (Cl. 33—50)

The present invention relates to telescopic sight mountings and more particulaly relates to telescopic sight mountings for rifles, firearms and the like.

There are two general classes of telescopic sights and sight mountings; one is a telescopic sight which has means in the sight to adjust for windage and elevation, the sight being rigidly mounted on the barrel of a firearm, such as a rifle; the other utilizes a telescopic sight which does not have means for adjusting for windage and elevation, but the mounting which secures the telescopic sight to the firearm includes means for adjusting the sight for windage and elevation. Both the adjustable telescopic sight and the fixed sight which is adjustable by means of the mount are relatively expensive, require many machined parts and are expensive to repair and maintain.

It is, therefore, a general object of the present invention to provide a mount for securing a telescopic sight to a firearm, such as a rifle, which may be adjusted for windage and elevation and which is relatively inexpensive to manufacture, maintain and repair.

It is yet a further object of the present invention to provide a mount of the above character which is of simplified construction and has a minimum of machined parts.

It is yet a further object of the present invention to provide means for mounting a telescopic sight on a firearm, such as a rifle, which includes a pair of spaced mounts, each mount including an eccentric which may be rotated to correct for windage and elevation.

It is yet a further object of the present invention to provide a telescopic sight assembly including a pair of spaced mounts, each being adjustable and of simplified construction.

It is a still further object of this invention to provide a mount for a telescopic sight which supports a pair of axially-aligned eccentrics by which adjustments for windage and elevation are made.

Other objects, features and advantages will be apparent from the following description of an example of the invention, given for the purpose of disclosure, and taken in connection with the accompanying drawing, in which like character references designate like parts throughout the several views, and where Figure 1 is a fragmentary and diagrammatic side elevation illustrating a mount constructed according to the invention and shown securing a conventional telescopic sight to a rifle, Figure 2 is a cross-sectional view taken along the line 2—2 of Figure 1, looking in the direction of the arrows, Figure 3 is a plan view of a mount illustrated in Figures 1 and 2, Figure 4 is a view similar to that of Figure 1 illustrating a modification, Figure 5 is a cross-sectional view taken along the line 2—2 of Figure 4, looking in the direction of the arrows, Figure 6 is a plan view taken along the line 6—6 of Figure 4, and Figure 7 is a side view, partly in section taken along the line 7—7 of Figure 4.

Referring now to the drawings, and particularly to Figure 1, a conventional refle is designated by the reference numeral 10, the barrel 12 of which has secured by the spaced adjustable mounts 14 the telescopic sight 16, the ocular end of which is held over the receiver of the rifle in the usual position. While a bolt-action rifle is illustrated in Figure 1, the adjustable mounts 14 may be applied to any firearm as desired to secure any desired telescopic sight thereto, such as illustrated at 16.

Each of the adjustable mounts 14 are identical, and, as best seen in Figure 2, the mount bases 18 are secured to the barrel 12 by means of the metal screws 20, although the mount bases 18 may be secured to the barrel 12 in any desired fashion, such as by welding, or may be formed on the barrel 12 during manufacture.

Formed on the upper surface of the mount bases 18 are the male dovetail members 22 which fit in the female dovetail members 24 of the mount brackets 26. As illustrated, the mount brackets 26 are divided vertically into two separate brackets 28 and 30 and are secured together and maintained in position on the mount bases 18 by means of the screws 32.

As best seen in Figure 1, the shoulders 34 are provided in the mount bases 18, the outer ends of the mount brackets 26 abutting against these shoulders to prevent any longitudinal slipping of the mount brackets 26.

The mount brackets 26 are cut off at the top, as at 37, to provide a suitable marker, as will be apparent later. The mount brackets 26 are formed with the circular bores 36 into which are placed the rings 38 which have the openings, such as the circular bores 40, disposed eccentrically to the outer surface 42 of the rings 38 and the bores 36 of the mount brackets 28, the bores 40 receiving and holding the telescopic sight tube 16.

In order that the rings 38 do not slip out of the bores 36 of the mount brackets 28, means are provided to retain the rings therein which may comprise providing the convex outer portions 42 of the rings 38 which fit into corresponding concave portions 44 in the bores 36. Any suitable means, however, may be provided to retain the eccentric rings 38 in the mount brackets 28, such as interfitting portions and the like, but it is necessary to provide a ball and socket or universal action when moving the rings 38 in making an adjustment because of the movement of the telescopic sight 16.

In order to rotate the rings 38 readily, a plurality of apertures 46 are provided on each of the rings 38 into which may be inserted a suitable wrench, not shown. On the perimeter of the rings 38, suitable indicia or peripheral scales are provided, which may be graduated to minutes, half minutes and one-tenth minute of angle as sired. Thus, rotation of the rings 38 gives the proper windage and elevation for any given situation, which may be read on the perimeter of the rings 38 taking one of the shoulders 37 as the index point.

In operation, the pair of axially-spaced mounts 14 maintain the telescopic sight tube 16 in adjusted position, each mount being adjustable. When it is desired to correct for windage and/or elevation, the screws 32 may be loosened and by inserting a wrench, not shown, in the apertures 46, the rings 38 may be moved thereby adjusting the position of the telescopic sight 16. When the proper adjustment has been made, the screws 32 may be tightened to prevent any inadvertent slipping of the adjustable mount when firing.

In rotating one of the eccentric rings 38, both windage and elevation adjustments will be made so that it is necessary in some instances to rotate the other of the eccentric rings 38 to make the desired adjustment. Thus, by manipulating both of the eccentric rings 38, either windage or elevation or both windage and elevation adjustments may be made. It seems apparent that a ball and socket or universal action is obtained when rotating the eccentric rings 38 to allow for slight movement of the telescopic sight.

A modification is illustrated in Figures 4–7 to which the reference letter *a* has been applied to parts corresponding to those of Figures 1–3, inclusive. Turning now to Figures 4–7, instead of a pair of mount bases 18 being utilized, a single mount base 18a is provided from which extend the mounts 14a. While these mounts 14a are spaced apart from one another, they may, in effect, be consolidated into a single mount so long as the rings 38a which it supports are axially aligned or are spaced axially from one another at least a relatively short distance.

The rings 38a are rotatably mounted in the bores 36a of the mounts 14a or a single consolidated mount, here shown as strap-like members 14a. Suitable means, such as the screws 32a, permit loosening and tightening of the rings 38a so that they may be adjusted as previously explained.

In this embodiment, the rings 38a are split to insure a good grip about the telescopic sight 16, and the scales 19 and index point 21 are changed as to location, and a pair of screws 32a are utilized instead of the single screw 32. In addition, the pins 46a are provided to assist in rotating the rings 38a.

The remaining parts and mode of operation are the same as previously described. Accordingly, no further description of this modification is deemed necessary.

The present application includes subject matter contained in application Serial No. 359,711, filed June 5, 1953, which application was abandoned prior to the filing of this application.

The present invention comprises, therefore, an adjustable mount for telescopic sights which is well adapted to carry out the objects set forth and others inherent therein, and has the advantages of a simplified construction and other advantages incidental thereto. Accordingly, it is desired to be limited only by the spirit of the invention as defined by the scope of the appended claims as numerous changes in details and rearrangement of parts will suggest themselves to those skilled in the art.

What is claimed is:

1. A telescopic sight mounting comprising, a pair of axially-spaced mount bases, a pair of mount brackets, each mount bracket including a pair of opposed mount bracket elements, interfitting portions on said mount bases and said mount brackets for securing one each of said mount brackets on said mount bases, locking screws extending horizontally through a lower end of each of said mount bracket elements for securing the mount bracket elements together and the mount brackets on the mount bases, a circular bore through each pair of mount bracket elements when the mount bracket elements are secured together, and a ring rotatably and tiltably mounted in each bore having an opening eccentric to the bore for reception of the telescopic sight and releasably held in said bore by said locking screw, whereby corrections in both elevation and windage are made by rotation of the rings.

2. A telescopic sight mounting comprising, a pair of axially-spaced mount bases, a pair of mount brackets, each mount bracket including a pair of opposed mount bracket elements, interfitting portions on said mount bases and said mount brackets for securing one each of said mount brackets on said mount bases, locking screws extending horizontally through a lower end of each of said mount bracket elements for securing the mount bracket elements together and the mount brackets on the mount bases, a circular bore through each pair of mount bracket elements when the mount bracket elements are secured together, a ring rotatably and tiltably mounted in each bore having an opening eccentric to the bore for reception of the telescopic sight and releasably held in said bore by said locking screw, and means on each ring for rotating each of said rings.

3. A telescopic sight assembly comprising, a pair of axially-spaced mount bases, a pair of mount brackets, each mount bracket including a pair of opposed mount bracket elements, interfitting portions on said mount bases and said mount brackets for securing one each of said mount brackets on said mount bases, locking screws extending horizontally through a lower end of each of said mount bracket elements for securing the mount bracket elements together and the mount brackets on the mount bases, a circular bore through each pair of mount bracket elements when the mount bracket elements are secured together, a ring rotatably and tiltably mounted in each bore having an opening eccentric to the bore for reception of the telescopic sight and releasably held in said bore by said locking screw, means on each ring for rotating each of said rings, and a telescopic sight secured in the opening of each of said rings.

4. In a telescopic sight mounting, a pair of axially-spaced sockets, each of said sockets provided with a circular bore when viewed in cross-section, a single ring rotatably and tiltably disposed in each socket, an opening in each ring eccentric to the outer surface of each said ring for reception of the telescopic sight, said telescopic sight being mounted solely by said sockets, and releasable locking means carried by each socket for releasably locking the rings against rotation.

5. In a telescopic sight mounting, at least one mount base, a pair of axially-spaced sockets carried by the mount base, each of said sockets provided with a circular bore when viewed in cross-section, a single ring rotatably and tiltably mounted in each socket, each of said rings being provided with an opening eccentric to the outer surface of the ring for reception of the telescopic sight, said telescopic sight being mounted solely by said sockets, and releasable locking means on each socket for locking the rings in adjusted position.

6. In a telescopic sight mounting, a pair of axially-spaced sockets, each of said sockets provided with a circular bore when viewed in cross-section, and a single ring rotatably and tiltably mounted in each socket, the bore of each of said rings being provided with an opening eccentric to its outer surface for reception of the telescopic sight, said telescopic sight being mounted solely by said sockets.

7. In a telescopic sight mounting, mount means, a pair of axially spaced sockets carried by the mount means, each of said sockets provided with a circular bore when viewed in cross-section, and a single ring rotatably and tiltably mounted in each socket, each said ring having an opening eccentric to its outer surface for reception of the telescopic sight, said telescopic sight being mounted solely by said sockets.

References Cited in the file of this patent

UNITED STATES PATENTS

| | | |
|---|---|---|
| 1,450,349 | Belding | Apr. 3, 1923 |
| 2,125,932 | Lennon | Aug. 9, 1938 |
| 2,336,107 | Litschert | Dec. 7, 1943 |
| 2,424,011 | De Gramont | July 15, 1947 |
| 2,456,214 | Poe | Dec. 14, 1948 |